(12) United States Patent
Fukano et al.

(10) Patent No.: US 7,637,440 B2
(45) Date of Patent: Dec. 29, 2009

(54) SUCK BACK VALVE

(75) Inventors: Yoshihiro Fukano, Moriya (JP); Tadashi Uchino, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 456 days.

(21) Appl. No.: 11/165,347

(22) Filed: Jun. 24, 2005

(65) Prior Publication Data
US 2005/0284954 A1 Dec. 29, 2005

(30) Foreign Application Priority Data
Jun. 29, 2004 (JP) .............................. 2004-191440

(51) Int. Cl.
*B05B 15/02* (2006.01)

(52) U.S. Cl. ...................... 239/119; 239/104

(58) Field of Classification Search ................. 239/119, 239/104, 106, 583, 586, 71, 73, 75; 91/5, 91/6, 41; 417/1, 26; 251/129.04, 285, 129.11; 141/115–127
See application file for complete search history.

(56) References Cited

U.S. PATENT DOCUMENTS

| 4,460,009 | A | * | 7/1984 | Nanci et al. ............... 137/243.6 |
| 4,705,063 | A | * | 11/1987 | Robinson ............... 137/315.03 |
| 5,016,687 | A | * | 5/1991 | Kawamura .................. 141/116 |
| 5,187,993 | A | * | 2/1993 | Nicholson et al. .......... 74/89.38 |
| 5,429,304 | A | * | 7/1995 | Tomita et al. ................ 239/119 |
| 5,918,810 | A | * | 7/1999 | Fukano et al. ............... 239/119 |
| 5,927,605 | A | * | 7/1999 | Odajima et al. ............. 239/119 |
| 5,931,384 | A | | 8/1999 | Fukano et al. |
| 5,938,119 | A | * | 8/1999 | Yamada et al. .............. 239/119 |
| 5,950,923 | A | * | 9/1999 | Fukano et al. ............... 239/119 |
| 5,950,924 | A | * | 9/1999 | Hatakeyama et al. ....... 239/119 |
| 5,967,414 | A | * | 10/1999 | Fukano et al. ............... 239/119 |
| 5,971,296 | A | * | 10/1999 | Fukano et al. ............... 239/119 |
| 5,979,792 | A | * | 11/1999 | Fukano et al. ............... 239/119 |
| 5,988,524 | A | * | 11/1999 | Odajima et al. ............. 239/119 |
| 5,988,526 | A | * | 11/1999 | Tzeng et al. ................. 239/119 |
| 6,000,629 | A | * | 12/1999 | Tamura et al. ............... 239/119 |
| 6,029,903 | A | * | 2/2000 | Fukano et al. ............... 239/119 |
| 6,056,208 | A | * | 5/2000 | Pirker et al. ................. 239/119 |
| 6,092,782 | A | * | 7/2000 | Yamada et al. ......... 251/129.04 |
| 6,131,820 | A | * | 10/2000 | Dodd .......................... 239/106 |

(Continued)

FOREIGN PATENT DOCUMENTS

JP          05-215258          8/1983

(Continued)

OTHER PUBLICATIONS

Pending U.S. Appl. No. 11/167,255, filed Jun. 28, 2005, by Yoshihiro Fukano et al.

*Primary Examiner*—Davis Hwu
(74) *Attorney, Agent, or Firm*—Paul A. Guss

(57) ABSTRACT

A suck back valve comprises a suction amount-adjusting mechanism including a screw member which regulates a displacement amount of a second piston integrally displaceable with a second diaphragm in accordance with abutment of a disk-shaped member, a rotary driving section which allows the screw member to move toward or away from the disk-shaped member, and a detecting section which detects a displacement amount of the screw member. Accordingly, it is possible to appropriately adjust the flow rate of the pressure fluid to be sucked under the negative pressure action of the second diaphragm.

11 Claims, 9 Drawing Sheets

U.S. PATENT DOCUMENTS

| | | | |
|---|---|---|---|
| 6,176,438 B1 * | 1/2001 | Sato et al. | 239/119 |
| 6,200,100 B1 * | 3/2001 | Yang et al. | 417/26 |
| 6,481,460 B2 * | 11/2002 | Fukano et al. | 137/554 |
| 6,755,354 B2 * | 6/2004 | Fukano et al. | 239/119 |
| 6,889,706 B2 * | 5/2005 | Fukano et al. | 137/487.5 |
| 7,070,159 B2 * | 7/2006 | Kajitani | 251/14 |
| 7,090,190 B2 * | 8/2006 | Yasue et al. | 251/63.5 |
| 7,117,886 B2 * | 10/2006 | Kajitani et al. | 137/487.5 |
| 7,143,956 B2 * | 12/2006 | Fukano | 239/119 |
| 2003/0178504 A1 * | 9/2003 | Fukano et al. | 239/119 |
| 2005/0284954 A1 * | 12/2005 | Fukano et al. | 239/119 |
| 2005/0284955 A1 * | 12/2005 | Fukano et al. | 239/119 |

FOREIGN PATENT DOCUMENTS

| | | |
|---|---|---|
| JP | 6-47092 | 6/1994 |
| JP | 07-077285 | 3/1995 |
| JP | 10-252919 | 9/1998 |
| JP | 10-318423 | 12/1998 |
| JP | 2003-139270 | 5/2003 |

* cited by examiner

SUCK BACK VALVE

BACKGROUND OF THE INVENTION

1. Field of the Invention

The present invention relates to a suck back valve capable of avoiding, for example, liquid from dripping from a supply port for a pressure fluid by sucking a predetermined amount of the pressure fluid allowed to flow through a fluid passage.

2. Description of the Related Art

A suck back valve has been hitherto used, for example, in the step of producing a semiconductor wafer or the like. The suck back valve functions to avoid so-called liquid dripping which would be otherwise caused such that a minute amount of the coating liquid drips from the supply port to the semiconductor wafer when the supply of the coating liquid to the semiconductor wafer is stopped.

A suck back valve concerning such a conventional technique is shown in FIG. 9 (see Japanese Patent Publication No. 6-47092).

The suck back valve 1 has a main body 5 which is formed with a flow chamber 4 for making communication between an inflow port 2 and an outflow port 3, and a cover 6 which is connected to an upper portion of the main body 5. The inflow port 2 is connected to a supply source (not shown) for a discharge liquid, while the outflow port 3 is connected to an unillustrated nozzle.

An opening 7, which extends in the upward direction, is formed at a substantially central portion of the flow chamber 4. A first diaphragm 8, which partitions the flow chamber 4 at the upper surface in an air-tight manner, is stretched over the opening 7. A vertically movable member 10, which has the lower end thereof allowed to abut against the first diaphragm 8, is arranged in an accommodating chamber 9 which is formed above the first diaphragm 8. A second diaphragm 11, which is interposed between the main body 5 and the cover 6, is arranged above the vertically movable member 10. The second diaphragm 11 and the vertically movable member 10 are integrally displaceable by the aid of a projection 12 which is caulked to the end of the vertically movable member 10 and which is secured to the second diaphragm 11.

A coil spring 13, which urges the second diaphragm 11 upwardly, is installed between the first diaphragm 8 and the second diaphragm 11. A pressure chamber 15, to which the pilot air is supplied via a pilot air port 14, is formed between the second diaphragm 11 and the cover 6. The cover 6 is provided with a detection unit 17 comprising a detection pin 16 to make abutment against the projection 12 of the vertically movable member 10.

The operation of the suck back valve 1 concerning the conventional technique will be schematically explained below. The pressure of the pressure chamber 15 is high as the pressure is supplied from an unillustrated electropneumatic proportional valve to the pilot air port 14 during the supply of the discharge liquid. The second diaphragm 11 is disposed at the lower position indicated by a two-dot chain line shown in FIG. 9, while resiliently contracting the coil spring 13. The first diaphragm 8, which is operated integrally with the vertically movable member 10, is also disposed at the lower position, and the volume of the flow chamber 4 is decreased.

In such a situation, when the supply source for the discharge liquid is deenergized to stop the discharge from the unillustrated nozzle, then the pilot pressure supplied from the pilot air port 14 is reduced, and the pressure in the pressure chamber 15 is lowered. Therefore, the first diaphragm 8 is moved upwardly integrally with the second diaphragm 11 and the vertically movable member 10 to a state shown by a solid line in FIG. 9. As a result, the first diaphragm 8 is deformed, and the volume of the flow chamber 4 is increased. Accordingly, the discharge liquid contained in the nozzle is sucked.

In this arrangement, the deformation of the first diaphragm 8 corresponds to the vertical movement of the vertically movable member 10, which is detected as the movement of the detection pin 16 of the detection unit 17. A detection signal is derived from the detection unit 17 to an unillustrated instruction unit to perform feedback control.

However, the suck back valve 1 concerning the conventional technique described above is not provided with any mechanism for adjusting the displacement amount of the vertically movable member 10 which is displaced integrally with the first diaphragm 8. Therefore, the conventional suck back valve is inconvenient in that it is not possible to arbitrarily set the suction amount of the discharge liquid contained in the nozzle corresponding to the displacement amount of the vertically movable member 10.

This is inconvenient, for example, because it is necessary for the operator to appropriately adjust and reset the suction amount of the liquid sucked by the first diaphragm 8 depending on, for example, the type, the flow rate, and the viscosity of the discharge liquid to be discharged from the nozzle.

SUMMARY OF THE INVENTION

A general object of the present invention is to provide a suck back valve capable of arbitrarily adjusting and resetting the suction amount of the liquid to be sucked by a suck back mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
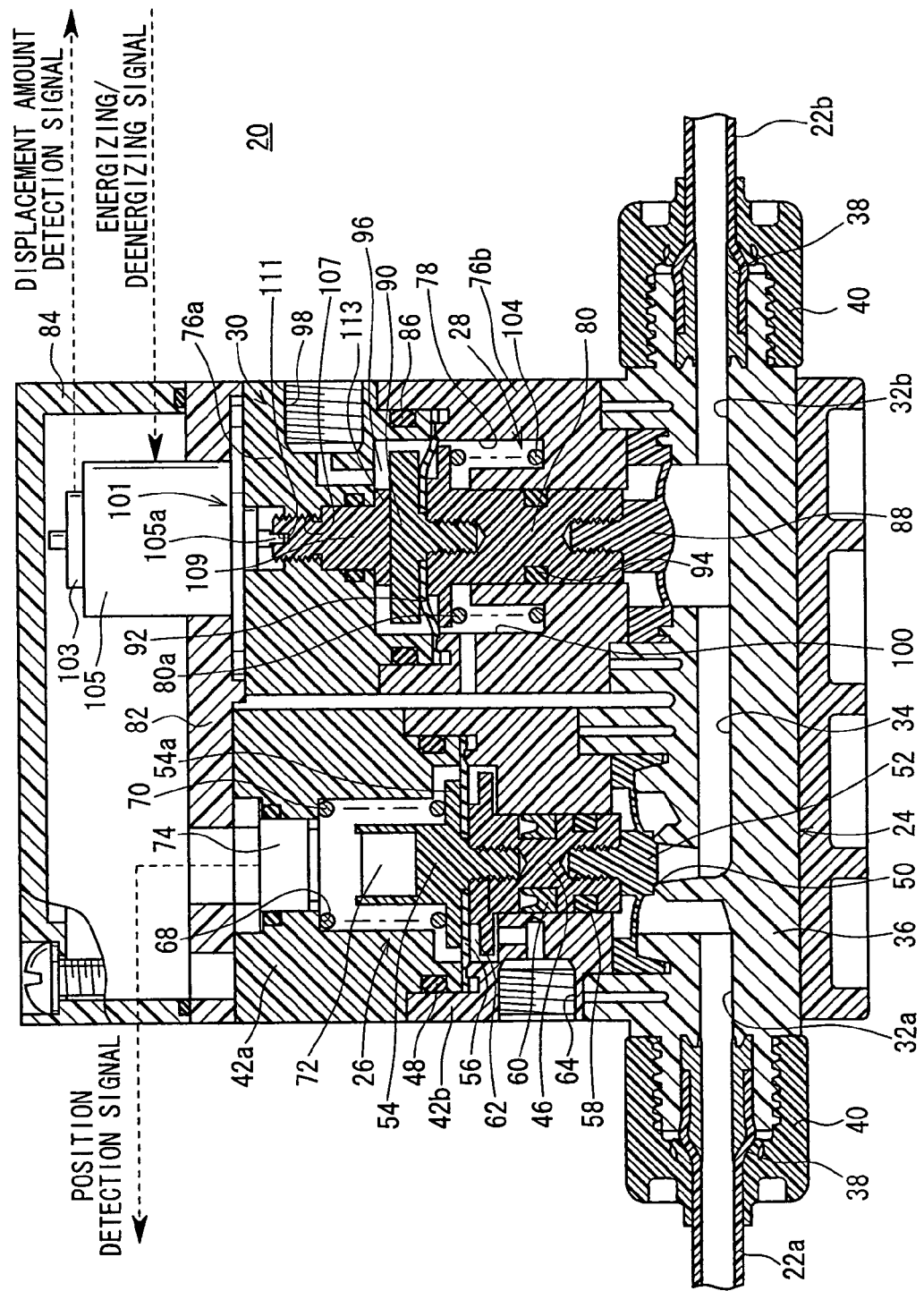
FIG. 1 is a longitudinal sectional view illustrating an arrangement of a suck back valve according to an embodiment of the present invention.

With reference to FIG. 1, reference numeral 20 indicates a suck back valve according to an embodiment of the present invention. The suck back valve 20 comprises a joint section 24 to which a pair of tubes 22a, 22b are detachably connected while being separated from each other by a predetermined spacing distance, and a valve-driving section 30 which is provided above the joint section 24 and which includes an ON/OFF valve 26 and a suck back mechanism 28 therein.

The joint section 24 includes a joint body 36 which has a first port 32a formed at one end and a second port 32b formed at the other end and which is provided with a fluid passage 34 for making communication between the first port 32a and the second port 32b, inner members 38 which are engaged with the first port 32a and the second port 32b respectively and which are inserted into openings of the tubes 22a, 22b respectively, and lock nuts 40 which retain liquid tightness or air tightness of connecting portions of the tubes 22a, 22b by being screwed into screw grooves which are engraved at the ends of the joint body 36.

Figure 2:
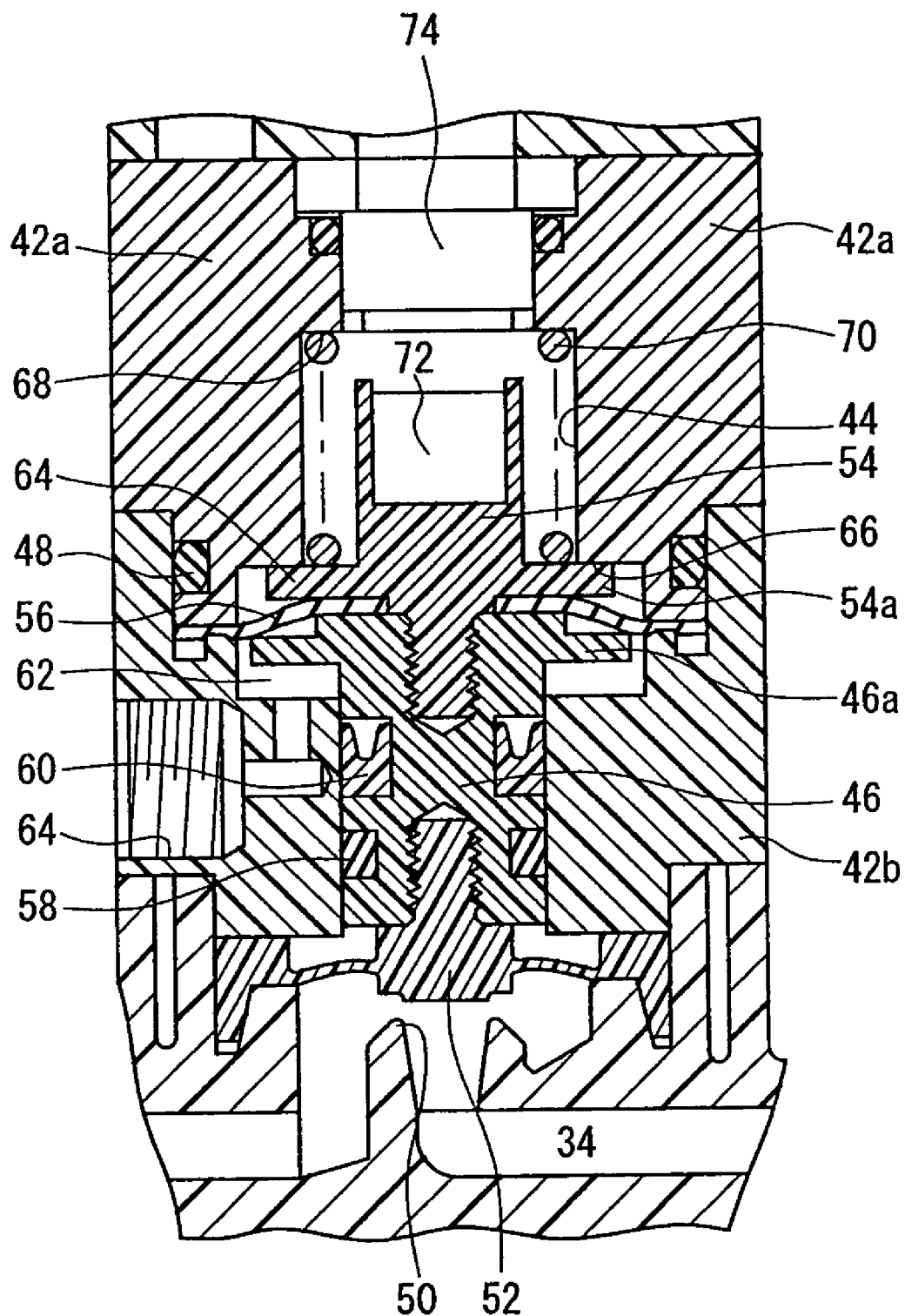
FIG. 2 is a partial magnified longitudinal sectional view illustrating an ON/OFF valve for constructing the suck back valve shown in FIG. 1.

The ON/OFF valve 26 is arranged on the joint section 24 disposed closely to the first port 32a. As shown in FIG. 2, the ON/OFF valve 26 includes a first upper valve body 42a and a first lower valve body 42b which are integrally connected to the joint body 36, and a first piston 46 which is arranged in a first chamber 44 formed in the first upper valve body 42a and the first lower valve body 42b and which is provided displaceably in the vertical direction. A first seal member 48 is installed to a connecting portion between the first upper valve body 42a and the first lower valve body 42b. Air tightness is retained for the first chamber 44 by means of the sealing action of the first seal member 48.

A valve plug 52, which closes the fluid passage 34 by being seated on a seat section 50, is screwed to one end of the first piston 46 in the axial direction. The valve plug 52 is composed of a thick-walled section which is disposed at a central portion, and a thin-walled section which is formed integrally at a circumferential portion of the thick-walled section. A connecting member 54 is fastened to the other end of the first piston 46 in the axial direction by the aid of a screw section. A first diaphragm 56 is interposed at a connecting portion between the first piston 46 and the connecting member 54. The first diaphragm 56 is formed to be thin-walled having a flat plate shape with its circumferential edge portion being interposed between the first upper valve body 42a and the first lower valve body 42b. An O-ring 58 and a packing 60 having a V-shaped cross section are installed to annular grooves on the outer circumferential surface of the first piston 46 respectively.

A cylinder chamber 62, which is closed by the first diaphragm 56 in an air-tight manner, is formed under the first diaphragm 56. The pressure fluid is supplied into the cylinder chamber 62 via a first pressure fluid inlet/outlet port 64 communicating with the cylinder chamber 62. The pressure fluid acts on a flange section 46a which is formed at an upper portion of the first piston 46 to press the first piston 46 in the upward direction. Therefore, the connecting member 54, the first piston 46, and the valve plug 52 are moved upwardly in an integrated manner under the flexible bending action of the first diaphragm 56, and thus the valve plug 52 is separated from the seat section 50 to effect the switching from the valve-closed state to the valve-open state (see FIG. 2).

As shown in FIG. 2, a flange section 54a of the connecting member 54, which protrudes radially outwardly, abuts against a wall surface 66 of the first upper valve body 42a, and thus the displacement in the upward direction is regulated.

A first spring member 70, which has one end fastened to the flange section 54a of the connecting member 54 and which has the other end fastened to an annular step 68 of the first upper valve body 42a, is provided in the first chamber 44. The first spring member 70 is provided so that the connecting member 54, the first piston 46, and the valve plug 52 are pressed downwardly by the spring force of the first spring member 70.

A magnet 72 is installed to a recess disposed at one end of the connecting member 54. The flange section 54a abuts against the wall surface 66 of the first upper valve body 42a, and thus the flange section 54a functions as a stopper to regulate the upward movement of the first piston 46.

A position detection sensor 74, which is composed of, for example, a Hall element to detect the position of the first piston 46, is provided for the first upper valve body 42a opposed to the magnet 72 while being separated by a predetermined spacing distance. In this embodiment, the position detection sensor 74 detects the magnetic field of the magnet 72 installed to one end of the connecting member 54. Accordingly, it is possible to detect the valve-open state and the valve-closed state of the ON/OFF valve 26 respectively, and it is possible to derive a position detection signal to a first control unit (see FIG. 4) via an unillustrated lead wire and a connector as described later on.

The suck back mechanism 28 is arranged on the joint section 24 disposed closely to the second port 32b. The suck back mechanism 28 includes a second upper valve body 76a and a second lower valve body 76b which are integrally connected to the joint body 36, and a second piston (displacement member) 80 which is arranged in a second chamber 78 formed in the second upper valve body 76a and the second lower valve body 76b and which is provided displaceably in the vertical direction.

The first upper valve body 42a and the first lower valve body 42b of the ON/OFF valve 26, and the second upper valve body 76a and the second lower valve body 76b of the suck back mechanism 28 are assembled integrally by a bonnet 82 and a cover member 84 which are commonly installed respectively. A second seal member 86 is installed to a connecting portion between the second upper valve body 76a and the second lower valve body 76b. Air tightness of the second chamber 78 is retained by the sealing action of the second seal member 86.

A second diaphragm (flexible member) 88 is connected to one end of the second piston 80 in the axial direction by a screw section. The second diaphragm 88 is composed of a thick-walled section which is disposed at a central portion, and a thin-walled section which is formed integrally at a circumferential portion of the thick-walled section.

A disk-shaped member 90 is fastened by a screw section to the other end of the second piston 80 in the axial direction. A thin-walled third diaphragm 92 having a flat plate shape is interposed between the second piston 80 and the disk-shaped member 90. The third diaphragm 92 has a circumferential edge portion interposed between the second upper valve body 76a and the second lower valve body 76b. An O-ring 94 is installed to an annular groove on the outer circumferential surface of the second piston 80.

A diaphragm chamber 96, which is closed by the third diaphragm 92 in an air-tight manner, is formed over the third diaphragm 92. The pressure fluid is supplied into the diaphragm chamber 96 via a second pressure fluid inlet/outlet port 98 communicating with the diaphragm chamber 96.

An annular groove 100, which has a diameter larger than the diameter of the second piston 80, is formed below the third diaphragm 92. A second spring member 104, which is fastened by a flange section 102 to press the second piston 80 in the upward direction, is arranged in the annular groove 100.

In this arrangement, the pressure fluid, which is supplied into the diaphragm chamber 96 via the second pressure fluid inlet/outlet port 98, acts on the upper surface portion of the disk-shaped member 90 to press the disk-shaped member 90 in the downward direction. Therefore, the disk-shaped member 90 and the second piston 80 are displaced in an integrated manner in the downward direction against the spring force of the second spring member 104 to a state in which the bottom surface of the thick-walled section of the second diaphragm 88 slightly protrudes toward the fluid passage 34.

A suction amount-adjusting mechanism 101, which adjusts the displacement amount of the second piston 80 that is displaceable integrally with the second diaphragm 88, is provided above the disk-shaped member 90.

The suction amount-adjusting mechanism 101 is composed of, for example, a stepping motor. The suction amount-adjusting mechanism 101 includes a rotary driving section (driving mechanism) 105 which is integrally equipped with a detecting section (detecting mechanism) 103 such as an encoder, and a screw member (stopper member) 109 which is engraved with a male thread screwed to a screw hole 107 of the second upper valve body 76a. The detecting section 103 may be constructed separately from the rotary driving section 105.

A groove 111, which is engaged with a rotary shaft 105a of the rotary driving section 105, is formed on one end surface of the screw member 109 in the axial direction. A stopper section 113, against which the disk-shaped member 90 makes abutment to regulate the displacement thereof, is formed on the other end surface.

In this arrangement, one end of the rotary shaft 105a of the rotary driving section 105 is loosely fitted into the groove 111 of the screw member 109 with a minute clearance. The screw member 109 is provided displaceably in the vertical direction of the screw hole 107 in accordance with the transmission of the rotary motion of the rotary shaft 105a. In this arrangement, the number of revolutions of the rotary driving section 105 is detected by the detecting section 103, and a second control unit controls the rotary motion of the rotary driving section 105 based on a detection signal derived from the detecting section 103 as described later on. Accordingly, it is possible to position the stopper section 113 of the screw member 109 at a predetermined position.

The suck back valve 20 according to the embodiment of the present invention is basically constructed as described above. Next, its operation, function, and effect will be explained.

Figure 4:
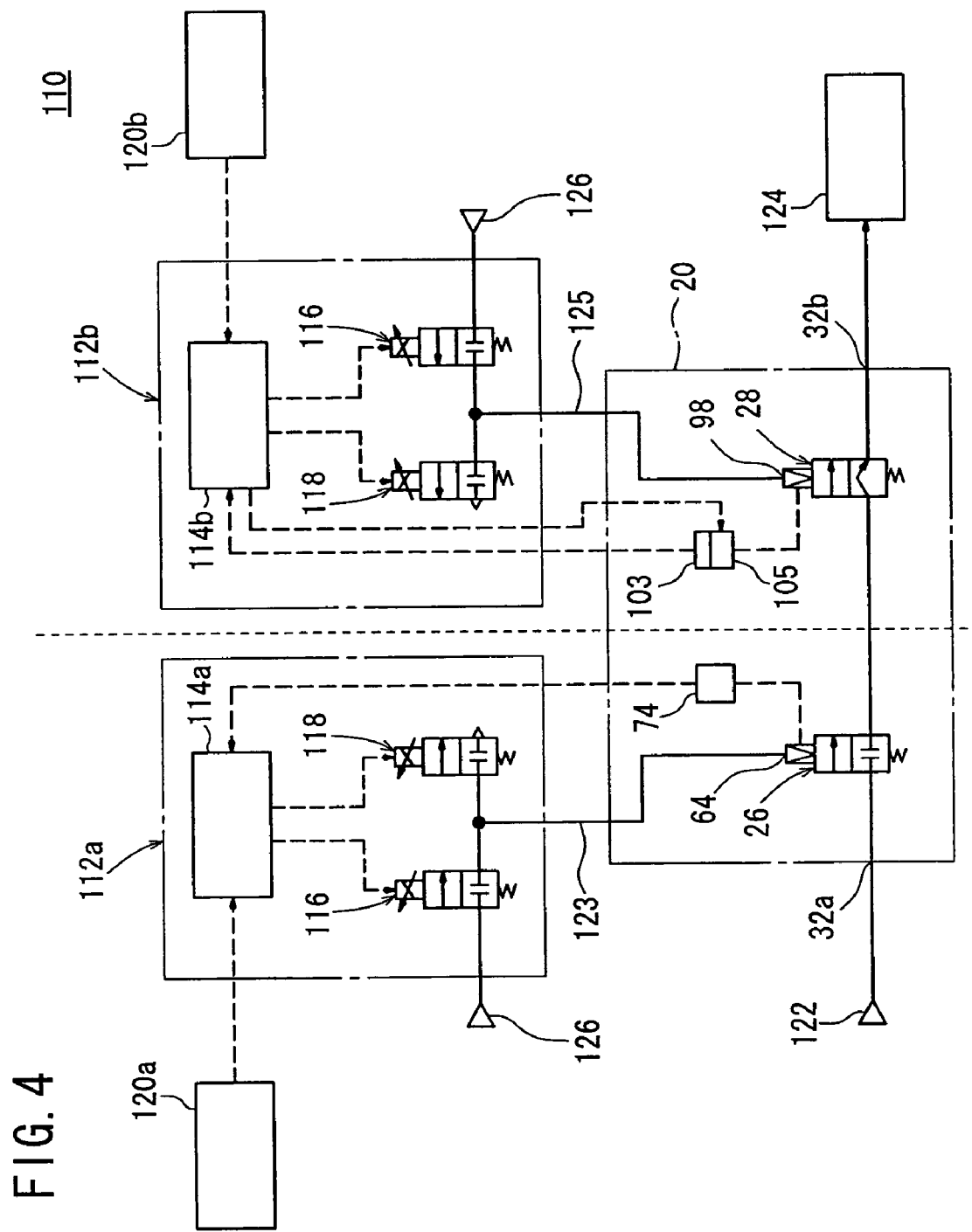
FIG. 4 is a schematic block diagram illustrating a suck back system into which the suck back valve shown in FIG. 1 is incorporated.

FIG. 4 shows a suck back system 110 into which the suck back valve 20 according to the embodiment of the present invention is incorporated.

The suck back system 110 comprises first and second electropneumatic proportional valves 112a, 112b which are constructed substantially identically and which output pneumatic pressure signals corresponding to inputted electric signals. The first and second electropneumatic proportional valves 112a, 112b respectively include first and second control units 114a, 114b, and supplying solenoid-operated valves 116 and discharging solenoid-operated valves 118 of the normally closed type which are energized and deenergized based on instruction signals (ON signals/OFF signals) outputted from the first and second control units 114a, 114b respectively. First and second data-setting mechanisms 120a, 120b, which introduce preset signals to the first and second control units 114a, 114b respectively, are connected to the first and second electropneumatic proportional valves 112a, 112b respectively.

In this arrangement, a passage 123, which is branched from a communication passage between the supplying solenoid-operated valve 116 and the discharging solenoid-operated valve 118 for constructing the first electropneumatic proportional valve 112a, is connected to the first pressure fluid inlet/outlet port 64 of the ON/OFF valve 26. On the other hand, a passage 125, which is branched from a communication passage between the supplying solenoid-operated valve 116 and the discharging solenoid-operated valve 118 for constructing the second electropneumatic proportional valve 112b, is connected to the second pressure fluid inlet/outlet port 98 of the suck back mechanism 28.

Unillustrated MPU (microprocessor unit), which functions as respective mechanisms of control, judgment, processing, calculation, and storage, is provided for each of the first and second control units 114a, 114b. The control signal, which is derived from the MPU, is used to energize and deenergize the supplying solenoid-operated valve 116 and/or the discharging solenoid-operated valve 118. Accordingly, it is possible to control the pilot pressure supplied to each of the cylinder chamber 62 of the ON/OFF valve 26 and the diaphragm chamber 96 of the suck back mechanism 28.

The position detection sensor 74 of the ON/OFF valve 26 is electrically connected to the first control unit 114a. The detection signal of the position detection sensor 74 is introduced into the first control unit 114a.

A coating liquid supply source 122, in which the coating liquid is stored, is connected to the tube 22a communicating with the first port 32a of the suck back valve 20. On the other hand, a coating liquid-dripping apparatus 124, which is provided with the nozzle for dripping the coating liquid to the unillustrated semiconductor wafer, is connected beforehand to the tube communicating with the second port 32b.

After performing the preparatory operation as described above, the pressure fluid supply source 126 is energized in the initial state shown in FIG. 1 to introduce the pressure fluid into the first and second electropneumatic proportional valves 112a, 112b, and the preset signals are introduced into the first and second control units 114a, 114b by the aid of the first and second data-setting mechanisms 120a, 120b. The first control unit 114a derives the energizing signal to only the supplying solenoid-operated valve 116 based on the preset signal to allow the supplying solenoid-operated valve 116 to be in the ON state. In this situation, the discharging solenoid-operated valve 118 is deenergized, which is in the OFF state. Therefore, the pilot pressure, which is introduced into the ON/OFF valve 26 by the aid of the supplying solenoid-operated valve 116, is supplied to the cylinder chamber 62, and the first piston 46 is moved upwardly. Accordingly, the ON/OFF valve 26 is in the ON state (see FIG. 2).

During this process, the magnetic field of the magnet 72 installed to one end of the first piston 46 is detected by the position detection sensor 74. The position detection signal, which is derived from the position detection sensor 74, is introduced into the first control unit 114a. Accordingly, the first control unit 114a confirms that the ON/OFF valve 26 is in the ON state.

On the other hand, the second control unit 114b derives the energizing signal to only the supplying solenoid-operated valve 116 based on the preset signal to allow the supplying solenoid-operated valve 116 to be in the ON state. In this situation, the discharging solenoid-operated valve 118 is deenergized, which is in the OFF state. Therefore, the pilot pressure, which is introduced into the suck back mechanism 28 by the aid of the supplying solenoid-operated valve 116, is supplied to the diaphragm chamber 96. The disk-shaped member 90 and the second piston 80 are displaced downwardly against the spring force of the second spring member 104 to a state in which the second diaphragm 88 slightly protrudes toward the fluid passage 34 (see FIG. 5).

The coating liquid, which is supplied from the coating liquid supply source 122 when the ON/OFF valve 26 is in the OFF state and the second diaphragm 88 of the suck back mechanism 28 slightly protrudes toward the fluid passage 34 as described above, flows along the fluid passage 34. The coating liquid is dripped onto the semiconductor wafer by the aid of the coating liquid-dripping apparatus 124. As a result, a coating film (not shown) having a predetermined film thickness is formed on the semiconductor wafer.

Figure 3:
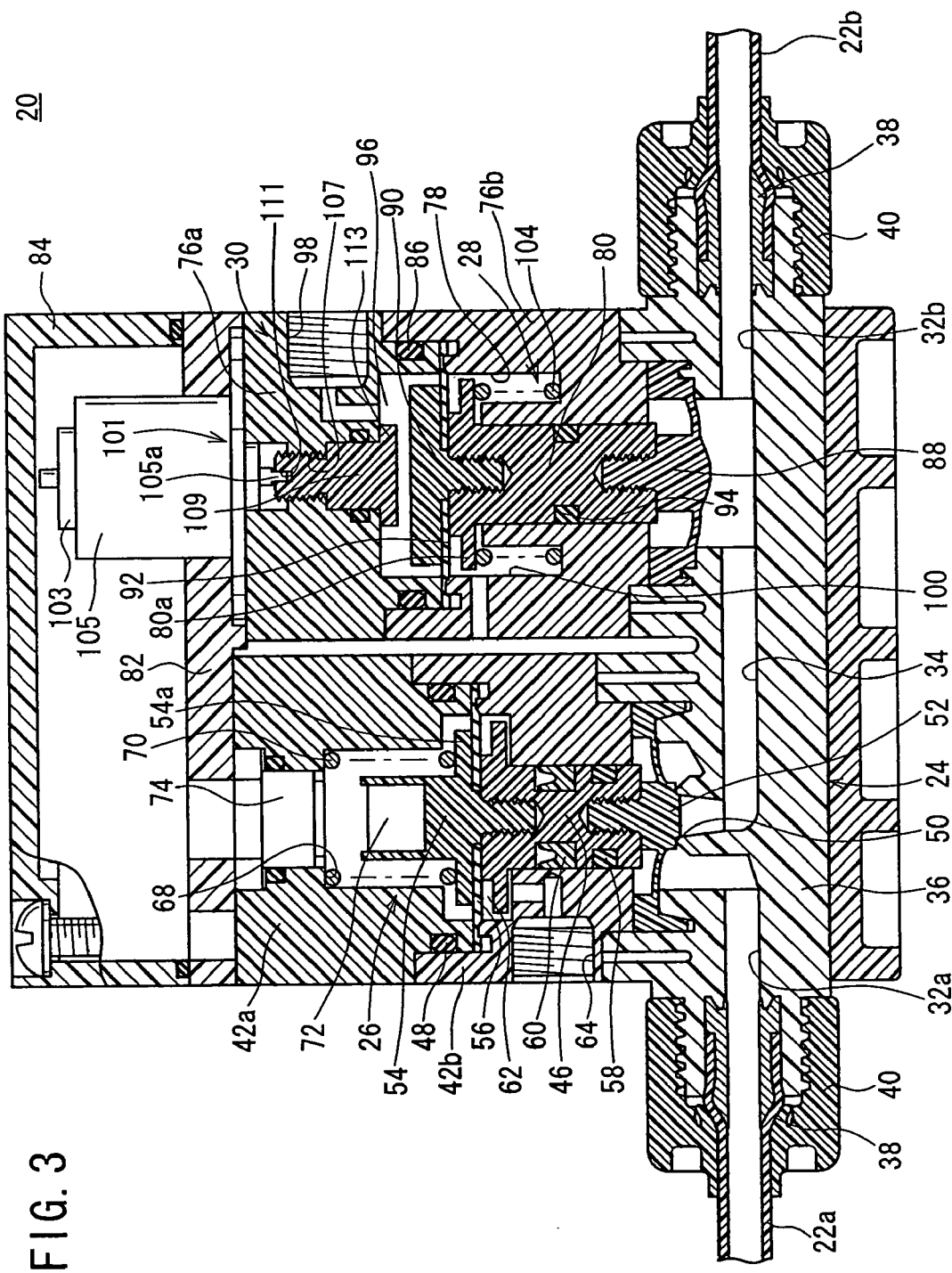
FIG. 3 is a longitudinal sectional view illustrating the arrangement depicting the operation of the suck back valve shown in FIG. 1.

After a predetermined amount of the coating liquid is applied to the unillustrated semiconductor wafer by the aid of the coating liquid-dripping apparatus 124, the supplying solenoid-operated valve 116 and/or the discharging solenoid-operated valve 118 is appropriately energized or deenergized by using the control signal derived from the unillustrated MPU of the first control unit 114a. Accordingly, the pilot pressure, which is supplied to the cylinder chamber 62 of the ON/OFF valve 26, is decreased to allow the ON/OFF valve 26 to be in the OFF state (see FIG. 3).

That is, when the pilot pressure, which is supplied to the cylinder chamber 62 of the ON/OFF valve 26, is decreased to be zero, then the first piston 46 is displaced downwardly under the action of the spring force of the first spring member 70, and the valve plug 52 is seated on the seat section 50. The first control unit 114a confirms that the ON/OFF valve 26 is in the OFF state by detecting, with the position detection sensor 74, the magnetic field of the magnet 72 displaced integrally with the first piston 46 and introducing the position detection signal into the first control unit 114a.

Therefore, the ON/OFF valve 26 is in the OFF state, and the fluid passage 34 is blocked. Accordingly, the supply of the coating liquid to the semiconductor wafer is stopped to interrupt the dripping state of the coating liquid from the nozzle of the coating liquid-dripping apparatus 124 to the semiconductor wafer. In this situation, the coating liquid just before dripping onto the semiconductor wafer remains in the nozzle of the coating liquid-dripping apparatus 124. Therefore, liquid dripping may occur undesirably.

Accordingly, the second control unit 114b derives the deenergizing signal to the supplying solenoid-operated valve 116 of the second electropneumatic proportional valve 112b to allow the supplying solenoid-operated valve 116 to be in the OFF state, simultaneously with which the second control unit 114b derives the energizing signal to the discharging solenoid-operated valve 118 to allow the discharging solenoid-operated valve 118 to be in the ON state.

Figure 6:
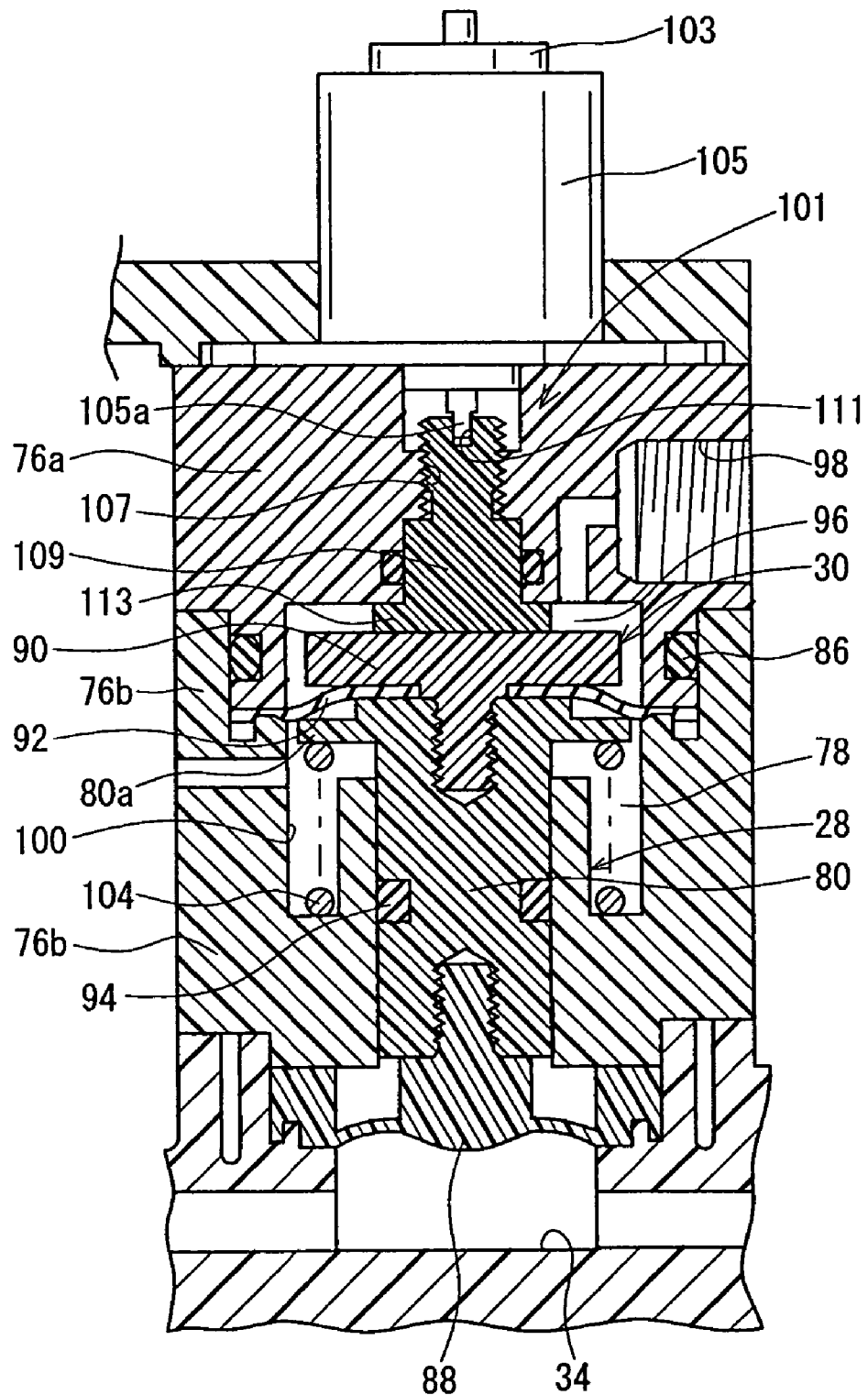
FIG. 6 is a partial magnified longitudinal sectional view illustrating a state in which the diaphragm is moved upwardly, and the displacement is regulated by a stopper section of a screw member.

Therefore, the supply of the pilot pressure to the diaphragm chamber 96 of the suck back mechanism 28 is stopped, and the pressure of the pilot pressure in the diaphragm chamber 96 is decreased to be zero. Accordingly, the second piston 80 is moved upwardly under the action of the spring force of the second spring member 104. In this situation, the disk-shaped member 90, which is displaced integrally with the second piston 80, has the upper surface section which abuts against the stopper section 113 of the screw member 109. Accordingly, the upward displacement is regulated (see FIG. 6).

Therefore, the second diaphragm 88, which is connected to one end of the second piston 80, is displaced integrally, and thus negative pressure action is generated. In this situation, a predetermined amount of the coating liquid contained in the fluid passage 34 is sucked. As a result, the predetermined amount of the coating liquid, which remains in the nozzle of the coating liquid-dripping apparatus 124, is sucked toward the suck back valve 20. Accordingly, it is possible to prevent the semiconductor wafer from suffering any liquid drips.

When the energizing signal is derived from the first control unit 114a to allow the ON/OFF valve 26 to be in the ON state, simultaneously with which the energizing signal is derived from the second control unit 114b to the supplying solenoid-operated valve 116 to give the ON state, and the deenergizing signal is derived to the discharging solenoid-operated valve 118 to give the OFF state, then the initial state is established. The dripping of the coating liquid onto the semiconductor wafer is then started.

Next, an explanation will be made about a procedure to adjust the flow rate of the fluid to be sucked by the second diaphragm 88 when, for example, the type of the coating liquid allowed to flow through the fluid passage 34 is changed.

The second control unit 114b derives the deenergizing signal to the rotary driving section 105 to rotate the rotary driving section 105 in a predetermined direction. The rotary motion is transmitted via the rotary shaft 105a to the screw member 109. The screw member 109 is displaced upwardly or downwardly along the screw hole 107 corresponding to the rotational direction of the rotary shaft 105a.

Figure 5:
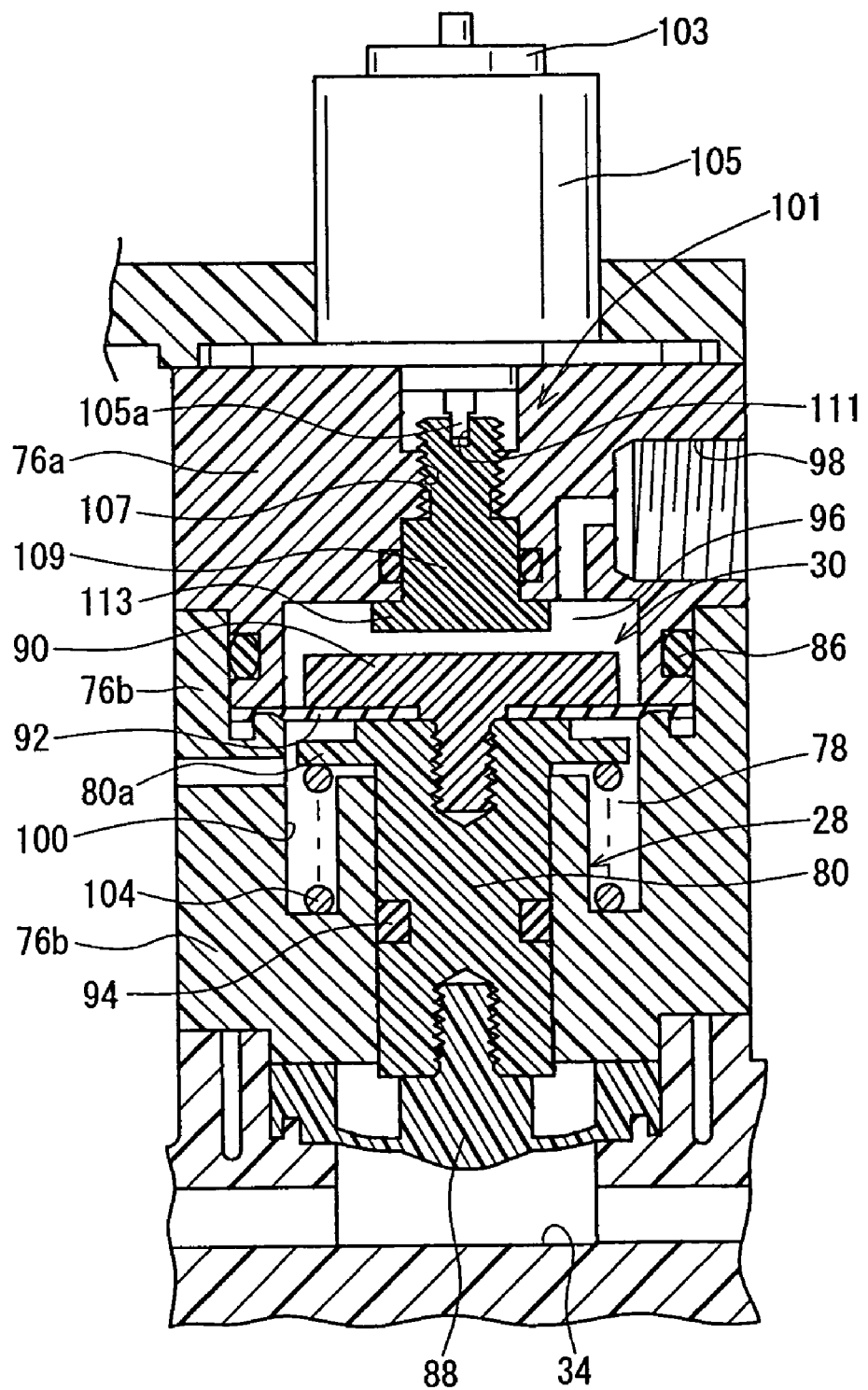
FIG. 5 is a partial magnified longitudinal sectional view illustrating a state in which a suck back mechanism is energized, and a diaphragm protrudes toward a fluid passage.
Figure 7:
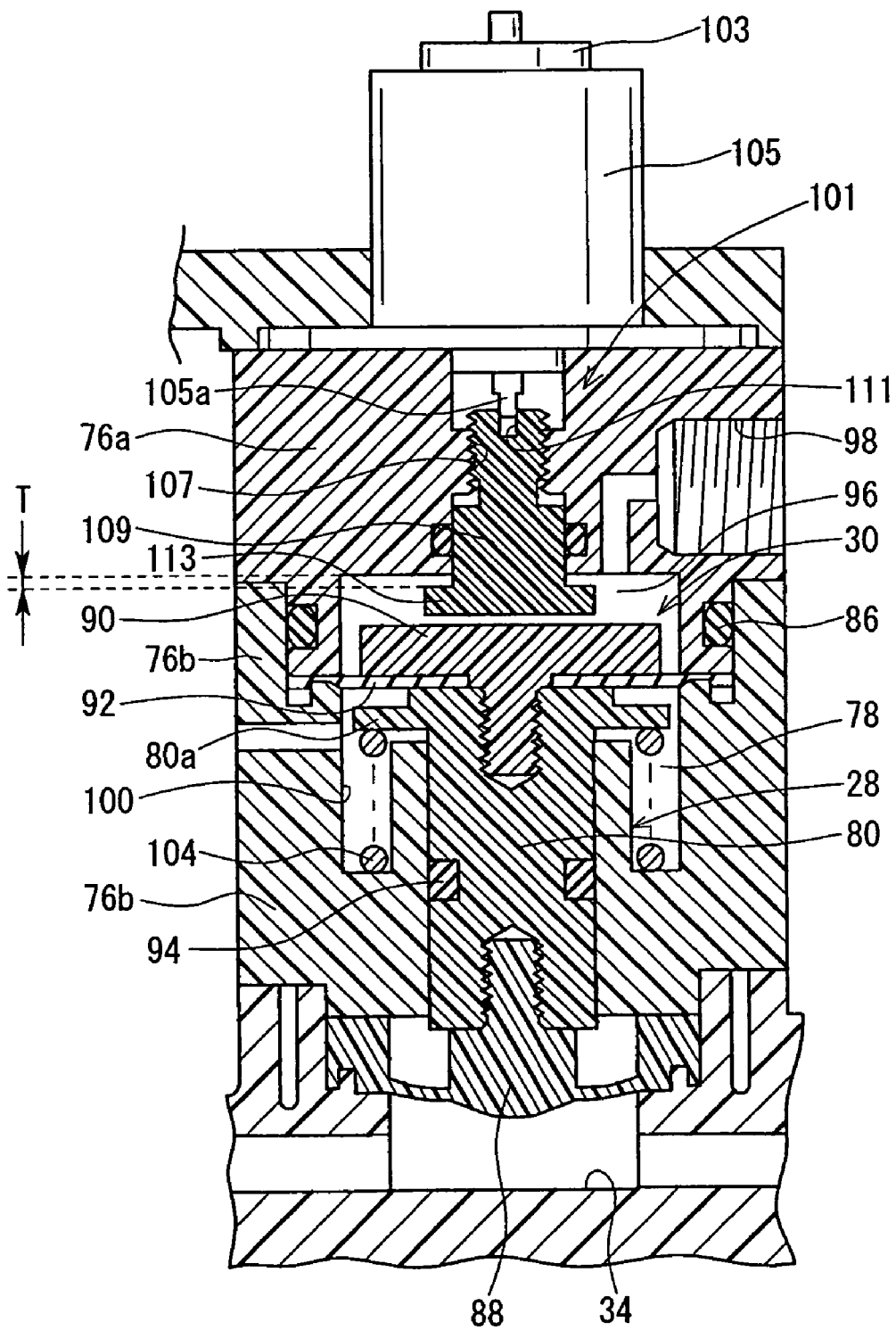
FIG. 7 is a partial magnified longitudinal sectional view illustrating a state in which the displacement amount of the screw member is changed.
Figure 8:
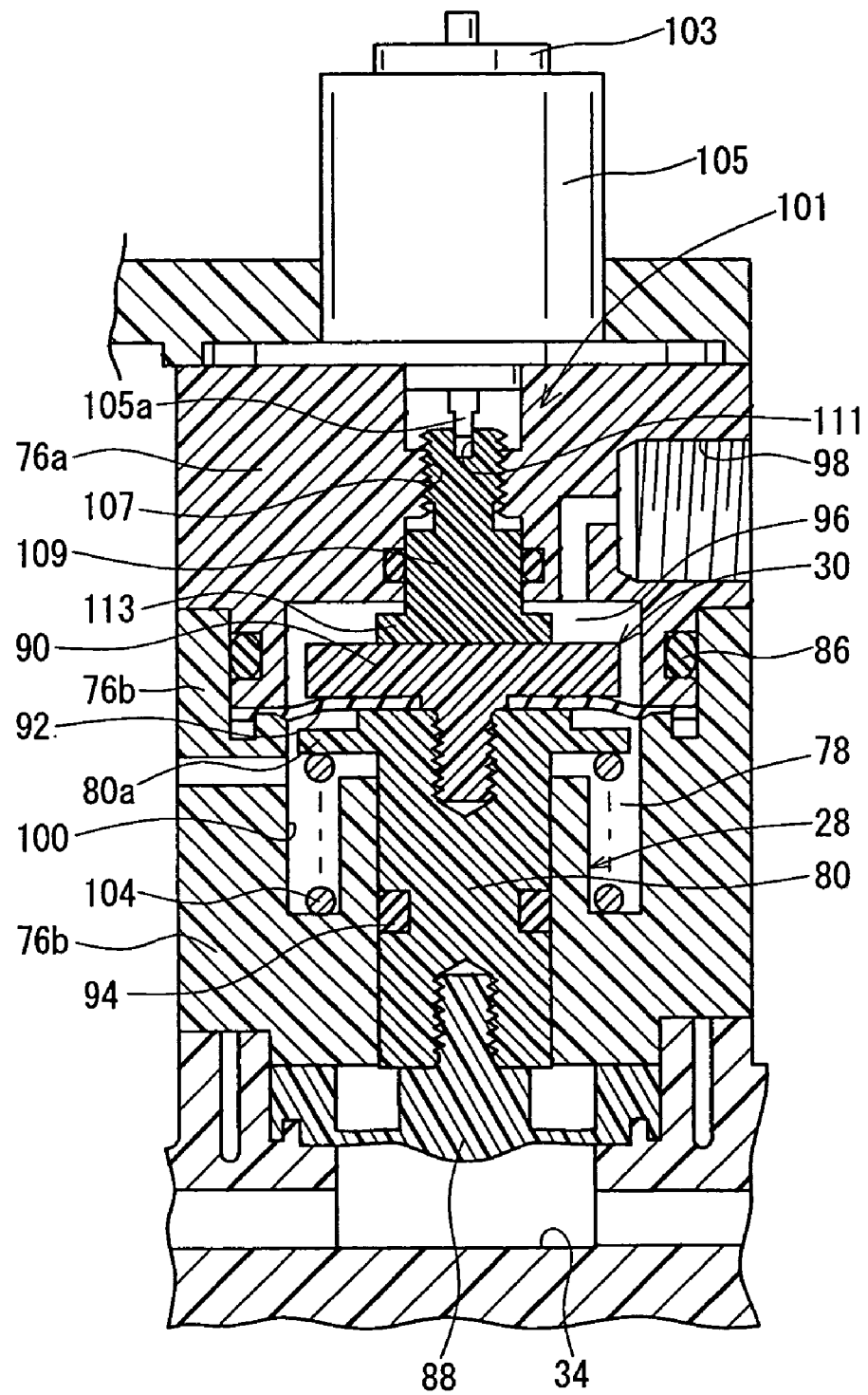
FIG. 8 is a partial magnified longitudinal sectional view illustrating a state in which the displacement amount of the diaphragm is regulated by the stopper section of the screw member.
Figure 9:
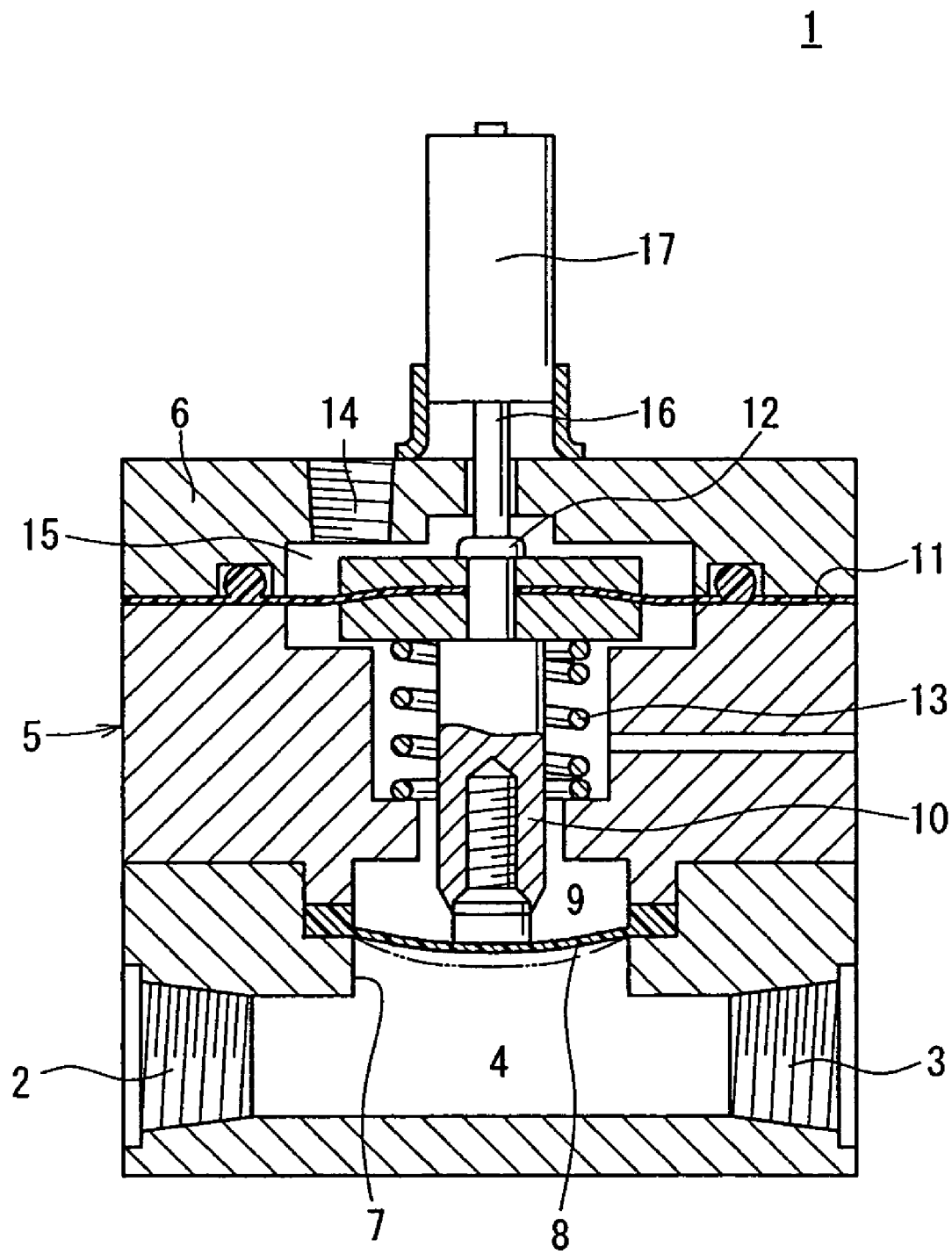
FIG. 9 is a longitudinal sectional view illustrating an arrangement of a suck back valve concerning the conventional technique.

FIG. 7 shows a state in which the screw member 109 is moved downwardly by a displacement amount T with respect to the screw hole 107 as compared with FIG. 5, and FIG. 8 shows a state in which the displacement amount of the second piston 80 is regulated by the stopper section 113 of the screw member 109.

In this situation, the second control unit 114b counts the number of revolutions of the rotary driving section 105 based on the detection signal supplied from the detecting section 103 equipped for the rotary driving section 105 to calculate the displacement amount T of the screw member 109 which is displaced corresponding to the number of revolutions. The stopper section 113, which is formed at the lower end of the screw member 109, is positioned at a predetermined position.

Therefore, it is possible to freely control the displacement amount of the second piston 80, in other words, the suction amount of the liquid to be sucked by the second diaphragm 88 by changing the position of the stopper section 113 which regulates the displacement amount of the second piston 80 displaced integrally with the second diaphragm 88.

As described above, in the embodiment of the present invention, for example, when it is necessary for the operator to appropriately adjust and reset the suction amount depending on, for example, the flow rate and the type of the discharge liquid to be discharged from the nozzle, the displacement amount of the second piston 80 which is movable upwardly integrally with the second diaphragm 88 can be freely adjusted and arbitrarily reset by displacing the screw member 109 by a predetermined amount in accordance with the rotary action of the rotary driving section 105.

In the embodiment of the present invention, the number of revolutions of the rotary driving section 105 is detected by the detecting section 103, and the detection signal is derived to the second control unit 114b to perform the feedback control. Accordingly, the stopper section 113 of the screw member 109 can be correctly positioned at a predetermined position. As a result, it is possible to accurately set the suction amount of the liquid to be sucked by the second diaphragm 88 corresponding to the displacement amount of the second piston 80 regulated by the stopper section 113.

Further, in the embodiment of the present invention, the suction amount is adjustable for the liquid to be sucked by the second diaphragm 88. Accordingly, it is possible to further improve the versatility and the convenience of use of the suck back valve 20.

Although certain preferred embodiments of the present invention have been shown and described in detail, it should be understood that various changes and modifications may be made therein without departing from the scope of the appended claims.

What is claimed is:

1. A suck back valve comprising:
a joint section which has a fluid passage and which includes a first port formed at one end and a second port formed at the other end;
an ON/OFF valve which opens and closes said fluid passage by means of a valve plug displaceable in accordance with a pilot pressure;
a suck back mechanism, which includes a displacement member displaceable in accordance with a pilot pressure and a flexible member connected to said displacement member to make displacement integrally, and which sucks a pressure fluid contained in said fluid passage under a negative pressure action of said flexible member; and
a suction amount-adjusting mechanism which adjusts a flow rate of said pressure fluid to be sucked under said negative pressure action of said flexible member,
wherein said suction amount-adjusting mechanism includes a stopper member which regulates a displacement amount of said displacement member in accordance with abutment of said displacement member, a driving mechanism, comprising a rotary driving section which has a non-threaded rotary shaft engaged with one end surface of said stopper member via a groove provided in said one end surface, which effects an energizing or deenergizing operation based on an electric signal so that, upon rotation of said rotary shaft, said stopper member is allowed to move toward or away from said displacement member, and a detecting mechanism which detects a displacement amount of said stopper member under a driving action of said driving mechanism,
wherein said displacement member remains out of contact with said stopper member during displacement of said displacement member and said flexible member, and
wherein said rotary shaft is not displaced linearly along the axial direction of said rotary shaft, one end of said rotary shaft being loosely fitted into said groove.

2. The suck back valve according to claim 1, wherein said stopper member comprises a screw member which has a male thread to be screwed to a screw hole of a valve body, said driving mechanism comprises a rotary driving section which has a rotary shaft engaged with said screw member, and said screw member is provided displaceably in upward and downward directions along said screw hole as rotary motion of said rotary shaft of said rotary driving section is transmitted thereto.

3. The suck back valve according to claim 2, wherein said rotary driving section comprises a stepping motor which is integrally equipped with an encoder.

4. The suck back valve according to claim 2, wherein said groove is formed at one end surface of said screw member in an axial direction, and a stopper section, which regulates said displacement amount of said displacement member, is formed at another end surface of said screw member.

5. The suck back valve according to claim 4, wherein said one end of said rotary shaft of said rotary driving section is loosely fitted to said groove of said screw member with a clearance interposing therebetween.

6. The suck back valve according to claim 1, wherein a suck back system, in which said suck back valve is incorporated, is provided, and said suck back system comprises a first electropneumatic proportional valve which includes a first control unit having a supplying solenoid-operated valve and a discharging solenoid-operated valve electrically connected thereto, and a second electropneumatic proportional valve which includes a second control unit having a distinct supplying solenoid-operated valve and a distinct discharging solenoid-operated valve electrically connected thereto.

7. The suck back valve according to claim 6, further comprising a passage which is branched from a communication passage between said supplying solenoid-operated valve and said discharging solenoid-operated valve of said first electropneumatic proportional valve, wherein said passage communicates with a first pressure fluid inlet/outlet port of said ON/OFF valve, and said pilot pressure is supplied to said ON/OFF valve.

8. The suck back valve according to claim 6, further comprising a passage which is branched from a communication passage between said supplying solenoid-operated valve and said discharging solenoid-operated valve of said second electropneumatic proportional valve, wherein said passage communicates with a second pressure fluid inlet/outlet port of said suck back mechanism, and said pilot pressure is supplied to said suck back mechanism.

9. The suck back valve according to claim 6, wherein a position detection sensor for detecting a position of said ON/OFF valve is electrically connected to said first control unit, and said detecting mechanism is electrically connected to said second control unit.

10. The suck back valve according to claim 1, wherein said ON/OFF valve is provided with a position detection sensor for detecting a position of said valve plug.

11. The suck back valve according to claim 10, wherein said position detection sensor detects a valve-open state and a valve-closed state of said ON/OFF valve respectively by detecting a magnetic field of a magnet installed to a connecting member connected to said valve plug.

* * * * *